United States Patent Office 2,847,605
Patented Aug. 12, 1958

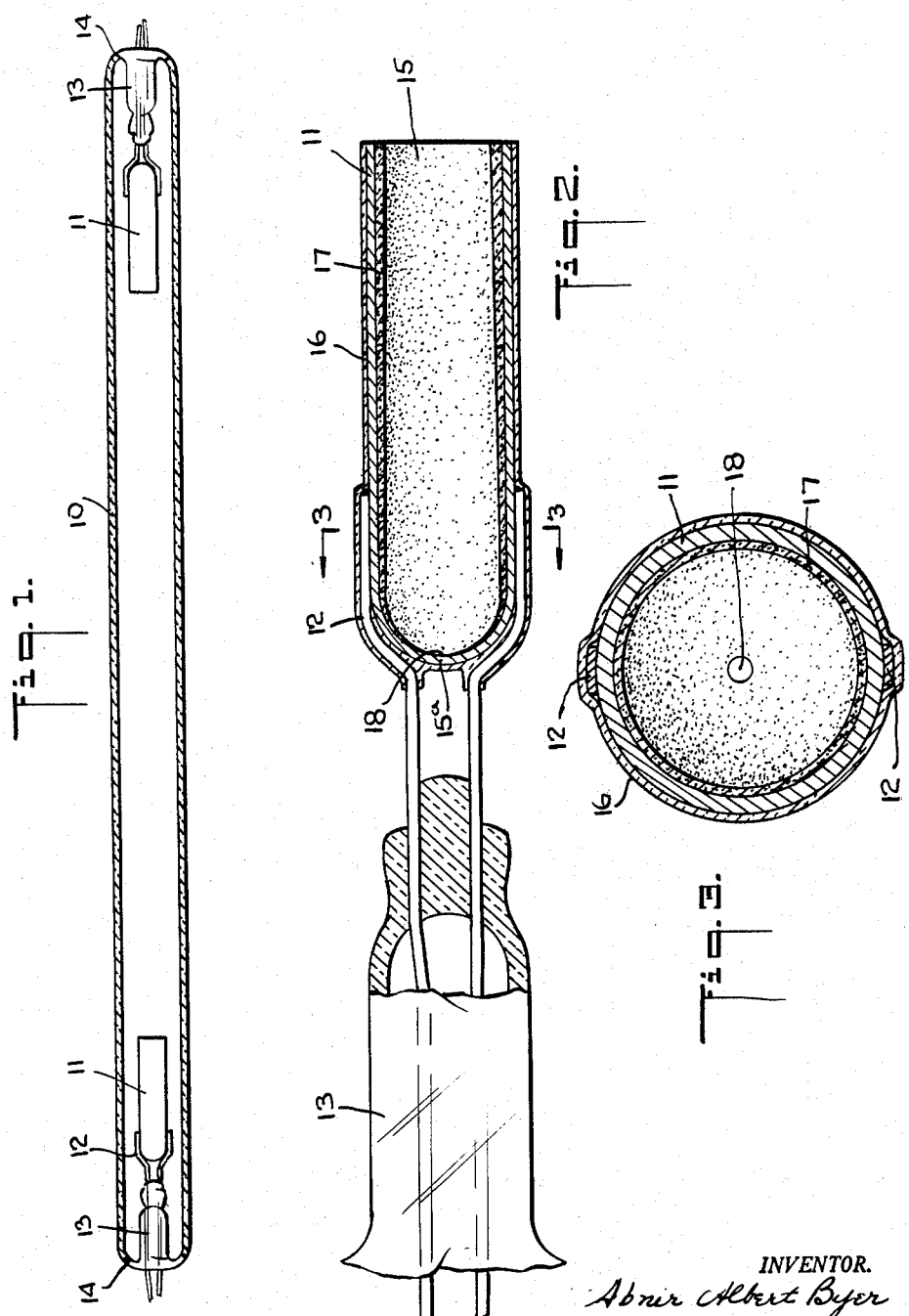

2,847,605
ELECTRODE FOR FLUORESCENT LAMPS

Abner Albert Byer, Great Neck, N. Y.

Application November 18, 1954, Serial No. 469,781

8 Claims. (Cl. 313—346)

This invention relates to electrodes for fluorescent lamps and more particularly to an electrode construction which improves the operation characteristics of the lamp with particular reference to the elimination of radio interference.

I have determined that the generation and discharge of high frequency waves from a fluorescent lamp may be traced to a plurality of conditions mostly originating in the electrodes of the lamp. With the foregoing in mind, I have produced an electrode which not only largely eliminates radio interference but is further of higher efficiency, reliability and longer life.

I have accomplished my objectives by providing an electrode which is so formed as to prevent, or at least minimize, parasitic high frequency oscillations which contribute little or nothing to the light output but which radiate and cause radio interference. The electrode further is so formed as to provide regulated emission characteristics in contrast to the random emission from varying starting points along the length of the electrode which includes the changing of such starting points during lamp operation. It is believed that such erratic action is a source of high frequency discharges and consequent radio interference.

In the electrode of this invention I provide an outer coating which is baked onto the electrode and is formed of a zero porosity vitreous material such as glass, vitreous enamels or ceramics. This coating is bonded to the outer walls of the electrode so as to have no spacing at any point between the electrode and the vitreous coating. By so treating the electrode, spaces which may support parasitic high frequency oscillations are eliminated.

The electrode further is provided with an electron emission coating on its inner walls which is of conventional material used for such purposes. For example, the usual oxide coatings or equivalent materials may be employed. This invention, however, involves an improved formation of such emissive coating in that it is made thinner or non-existent at a particular point to control the initiation of emission, and it increases in thickness so that the control is continued substantially throughout the life of the electrode.

The invention will be further understood from the following description and drawings in which:

Figure 1 is a longitudinal cross-sectional view of a fluorescent lamp provided with the improvements of this invention;

Figure 2 is an enlarged cross-sectional view of the electrode portion thereof;

Figure 3 is an enlarged cross-sectional view as taken along the line 3—3 of Figure 2.

The lamp, apart from the electrode improvement, is conventional and comprises a glass tube or envelope 10. The lamp is of the cold cathode type wherein a relatively higher voltage is applied to the electrodes without employing supplementary heating means.

An electrode 11 is disposed at each end of the tube and each electrode serves as a terminal for the electric current. The electrode 11 is formed of iron or tungsten or any other suitable metal and, in the form shown, a pair of lead-in wires 12 are welded or otherwise connected to the electrode outer wall. The wires 12 are actually connected to the electrode outer wall. The wires 12 are actually connected together electrically so that they are in reality a single wire for the transmission of electric current, the use of two wires merely serving as mechanical strengthening means. The wires are embedded or sealed in a glass holder 13 which is fused at 14 to the end of the lamp so as to produce an airtight structure which is thereafter evacuated and filled with a gas, such as argon or neon as is well understood.

In the form shown, the electrode 11 is elongated and tubular and has an open end 15 which faces inwardly of the tube and a closed end 15a which faces rearwardly or outwardly of the tube. Pursuant to this invention, I coat the outer walls with a zero porosity vitreous coating 16 which is then baked upon such outer walls to form a substantially integral structure. For example, the coating may be first sprayed or dipped and then baked in a kiln. As noted in Figure 2, since the vitreous coating has been applied after the wires 12 have been connected to the electrode, the coating also covers such wires.

As above stated, it has been found that the insulating vitreous coating, applied as described, removes sources of parasitic high frequency oscillations which might otherwise exist on the outer walls of the electrode. For example, it has been found in the past that electrodes tend to pit on their outer walls and such pitting provides areas which support such parasitic high frequency oscillations. By my invention, such pitting and the consequent support of such oscillations is prevented. In other words, by applying the vitreous coating to the electrode without any spacing between them, I also prevent the possibility of any subsequent space occurring by reason of pitting. In the absence of such spacing, high frequency oscillations will ordinarily not be supported.

In addition to the foregoing, I provide an internal emissive coating 17 which also serves to discourage high frequency discharges so that radio interference is further minimized. This emissive coating, although of the usual and conventional material for this purpose, whether known oxides or thorium or the like, is applied with a thinness approaching zero thickness at the inner center 18 of the closed end 15a of the electrode. A small dot, a few microns in diameter, will not be provided with any coating so that bare metal is exposed, and the coating will uniformly taper toward the open end 15 of the electrode to a maximum thickness. Purely as an example, the taper may be from zero microns at the inner center 18 to about 80 microns at the open end. It should be understood however, that these figures are purely illustrative since it is the taper that is the important consideration.

The purpose of the taper is to insure or at least tend to concentrate the initial emission at the center point 18, such emission extending to the other electrode as is well understood. As the emissive coating around point 18 tends to wear away, the emission will proceed from the thinner portions of the coating in the direction of the thicker portions. Thus the emission will proceed uniformly from the closed end to the open end and will continue until the oxide or other emissive coating is used up and the electrode becomes burned out. This has a great advantage of avoiding random starting points or abruptly changing emission points during operation and providing a uniform beam which avoids erratic action and random, steep wave front discharges which generate high frequency components and consequent radio interference. In addition, the life of the electrode is extended by both of the expedients mentioned.

What is claimed is:

1. An electrode for a fluorescent lamp, said electrode comprising an elongated metallic tubular terminal having one end closed and the other end open and an emissive coating along an internal wall thereof, said emissive coating varying uniformly in thickness from said one end of said terminal to the other.

2. An electrode according to claim 1 and wherein said emissive coating thins down to zero at one said end of said terminal so as to expose the metal of said terminal at said end.

3. An electrode for a fluorescent lamp, said electrode comprising an elongated metallic tube having one end thereof closed and the other open, and an emissive coating disposed around the inner walls of said tube, said emissive coating increasing in thickness from the closed end of the tube to the open end.

4. An electrode according to claim 3 and wherein the thickness of said emissive coating at the inner center of said closed end is zero and uniformly increases in thickness toward the open end.

5. An electrode according to claim 4 and including an outer, non-porous insulating non-emissive, continuous coating bonded to the outer walls of said tube and completely covering said outer walls.

6. An electrode according to claim 4 and including electric wire means secured to the outer walls of said tube and an outer, continuous, non-emissive vitreous coating bonded to and completely covering the outer walls of said tube and enveloping said electric wire means.

7. An electrode for a fluorescent lamp, said electrode comprising an elongated metallic tube having one end thereof closed and the other open, an emissive coating disposed around the inner walls of said tube, a non-porous, continuous, vitreous non-emissive coating bonded around the outer walls of said tube so as to have no spacing between said outer walls and said vitreous coating, said emissive coating increasing in thickness from the closed end of the tube to the open end thereof.

8. An electrode according to claim 7 and wherein said emissive coating is of zero thickness at said closed end and uniformly increases in thickness to said open end.

References Cited in the file of this patent

UNITED STATES PATENTS

| | | |
|---|---|---|
| 1,953,625 | Miesse | Apr. 3, 1934 |
| 1,955,079 | Michelssen | Apr. 17, 1934 |
| 2,443,632 | Miller | June 22, 1948 |